(12) United States Patent
Cypher

(10) Patent No.: US 8,856,619 B1
(45) Date of Patent: Oct. 7, 2014

(54) STORING DATA ACROSS GROUPS OF STORAGE NODES

(75) Inventor: Robert Cypher, Saratoga, CA (US)

(73) Assignee: Google Inc., Mountain View, CA (US)

( * ) Notice: Subject to any disclaimer, the term of this patent is extended or adjusted under 35 U.S.C. 154(b) by 280 days.

(21) Appl. No.: 13/416,119

(22) Filed: Mar. 9, 2012

(51) Int. Cl.
*G11C 29/00* (2006.01)

(52) U.S. Cl.
USPC ............................................ 714/770; 714/6.2

(58) Field of Classification Search
CPC ...................... G06F 2211/1028; G06F 11/1076
USPC .................................................. 714/6.2, 770
See application file for complete search history.

(56) References Cited

U.S. PATENT DOCUMENTS

| | | | |
|---|---|---|---|
| 6,032,269 A | 2/2000 | Renner, Jr. | |
| 6,151,641 A | 11/2000 | Herbert | |
| 6,216,247 B1 | 4/2001 | Creta et al. | |
| 6,378,038 B1 | 4/2002 | Richardson et al. | |
| 6,721,317 B2 | 4/2004 | Chong, Jr. | |
| 6,779,014 B1 * | 8/2004 | Ting et al. | 708/530 |
| 7,076,606 B2 * | 7/2006 | Orsley | 711/114 |
| 7,356,752 B2 | 4/2008 | Hewitt et al. | |
| 7,398,459 B2 | 7/2008 | Park et al. | |
| 7,505,890 B2 | 3/2009 | Kuznetsov et al. | |
| 7,546,484 B2 | 6/2009 | Sen et al. | |
| 7,624,229 B1 | 11/2009 | Longinov | |
| 7,676,730 B2 | 3/2010 | Haugan et al. | |
| 7,739,446 B2 | 6/2010 | Kano | |
| 7,774,681 B2 | 8/2010 | Earhart et al. | |
| 7,831,764 B2 | 11/2010 | Nakajima et al. | |
| 7,861,035 B2 | 12/2010 | Baek et al. | |
| 7,861,052 B2 | 12/2010 | Kawamura et al. | |
| 7,958,303 B2 * | 6/2011 | Shuster | 711/114 |
| 8,055,845 B2 * | 11/2011 | Soules et al. | 711/118 |
| 8,065,555 B2 | 11/2011 | Maiyuran et al. | |
| 8,082,393 B2 | 12/2011 | Galloway et al. | |
| 8,090,792 B2 | 1/2012 | Dubnicki et al. | |
| 8,140,753 B2 | 3/2012 | Galloway et al. | |
| 8,145,865 B1 | 3/2012 | Longinov et al. | |
| 8,176,247 B2 | 5/2012 | Galloway et al. | |
| 8,180,954 B2 | 5/2012 | Kilzer et al. | |
| 8,213,205 B2 | 7/2012 | Rajan | |
| 8,234,539 B2 | 7/2012 | Erez | |
| 8,255,761 B1 | 8/2012 | Pi et al. | |

(Continued)

OTHER PUBLICATIONS

Reed Solomon; Wikipedia; http://en.wikipedia.org/wiki/Reed_Solomon; Jan. 1, 2100; 14 pages.

(Continued)

*Primary Examiner* — Steve Nguyen
(74) *Attorney, Agent, or Firm* — Fish & Richardson P.C.

(57) ABSTRACT

Methods, systems, and apparatus, including computer programs encoded on a computer storage medium, for storing data reliably across groups of storage nodes. In one aspect, a method includes receiving (n–f) data chunks for storage across n groups of storage nodes and generating (f–1) error-correcting code chunks using an error-correcting code and the (n–f) data chunks. The (n–f) data chunks are stored at a first group of storage nodes. Each data chunk of the (n–f) data chunks is stored at a respective second group of storage nodes. Each code chunk of the (f–1) code chunks is stored at a respective third group of storage nodes. Each second group of storage nodes and each third group of storage nodes is distinct from each other and from the first group of storage nodes.

21 Claims, 8 Drawing Sheets

(56) References Cited

U.S. PATENT DOCUMENTS

| | | |
|---|---|---|
| 8,279,755 B2 | 10/2012 | Luby |
| 8,281,181 B2 * | 10/2012 | Resch .................... 714/6.2 |
| 8,327,234 B2 | 12/2012 | Earnshaw et al. |
| 2001/0044879 A1 * | 11/2001 | Moulton et al. ............ 711/114 |
| 2003/0149750 A1 | 8/2003 | Franzenburg |
| 2006/0080505 A1 | 4/2006 | Arai et al. |
| 2009/0262839 A1 | 10/2009 | Shelby et al. |
| 2009/0265578 A1 | 10/2009 | Baloun et al. |
| 2010/0037117 A1 | 2/2010 | Pescatore |
| 2010/0217915 A1 | 8/2010 | O'Connor et al. |
| 2012/0036333 A1 | 2/2012 | Lecrone et al. |
| 2012/0042142 A1 | 2/2012 | Garman et al. |
| 2012/0042200 A1 | 2/2012 | Takeuchi et al. |
| 2012/0042201 A1 | 2/2012 | Resnick |
| 2012/0131383 A1 | 5/2012 | Galloway et al. |
| 2012/0246548 A1 | 9/2012 | Buckley et al. |

OTHER PUBLICATIONS

Duminuco, Alessandro ; Hierarchical Codes: How to Make Erasure Codes Attractive for Peer-to-Peer Storage Systems; 2008 (P2P'08); pp. 8-11; 10 pages; Proceedings of the Eighth International Conference on Peer-to-Peer Computing.

Hafner, James ; HoVer Erasure Codes for Disk Arrays; Proceedings of the 2006 International Conference on Dependable Systems and Networks; 2006; pp. 217-226, 10 pages.

Li, Mingqiang ; GRID Codes: Strip-Based Erasure Codes with High Fault Tolerance for Storage Systems; ACM Transactions on Storage; Jan. 2009; vol. 4, No. 4, Article 15, 22 pages.

* cited by examiner

|    | 0 | 1 | 2 | 3 | 4 | 5 |
|----|---|---|---|---|---|---|
| 0  | X | X |   |   |   |   |
| 1  | X |   | X |   |   |   |
| 2  | X |   |   | X |   |   |
| 3  | X |   |   |   | X |   |
| 4  | X |   |   |   |   | X |
| 5  |   | X | X |   |   |   |
| 6  |   | X |   | X |   |   |
| 7  |   | X |   |   | X |   |
| 8  |   | X |   |   |   | X |
| 9  |   |   | X | X |   |   |
| 10 |   |   | X |   | X |   |
| 11 |   |   | X |   |   | X |
| 12 |   |   |   | X | X |   |
| 13 |   |   |   | X |   | X |
| 14 |   |   |   |   | X | X |

FIG. 4

|   | 0 | 1 | 2 | 3 | 4 | 5 |
|---|---|---|---|---|---|---|
| 0 | a | e | | | | |
| 1 | b | | i | | | |
| 2 | c | | | m | | |
| 3 | d | | | | q | |
| 4 | abcd | | | | | u |
| 5 | | f | j | | | |
| 6 | | g | | n | | |
| 7 | | h | | | r | |
| 8 | | efgh | | | | v |
| 9 | | | k | o | | |
| 10 | | | l | | s | |
| 11 | | | ijkl | | | w |
| 12 | | | | p | t | |
| 13 | | | | mnop | | x |
| 14 | | | | | qrst | uvwx |
| 0 | e | a | | | | |
| 1 | i | | b | | | |
| 2 | m | | | c | | |
| 3 | q | | | | d | |
| 4 | u | | | | | abcd |
| 5 | | j | f | | | |
| 6 | | n | | g | | |
| 7 | | r | | | h | |
| 8 | | v | | | | efgh |
| 9 | | | o | k | | |
| 10 | | | s | | l | |
| 11 | | | w | | | ijkl |
| 12 | | | | t | p | |
| 13 | | | | x | | mnop |
| 14 | | | | | uvwx | qrst |

Rows 0–14 top section: 602
Rows 0–14 bottom section: 604

FIG. 6

|    | 0   | 1     | 2     | 3     | 4     | 5     |
|----|-----|-------|-------|-------|-------|-------|
| 0  | a   | e     |       |       |       |       |
| 1  | b   |       | i     |       |       |       |
| 2  | c   |       |       | m     |       |       |
| 3  | abc |       |       |       | q     |       |
| 4  | (abc) |     |       |       |       | u     |
| 5  |     | f     | j     |       |       |       |
| 6  |     | g     |       | n     |       |       |
| 7  |     | efg   |       |       | r     |       |
| 8  |     | (efg) |       |       |       | v     |
| 9  |     |       | k     | o     |       |       |
| 10 |     |       | ijk   |       | s     |       |
| 11 |     |       | (ijk) |       |       | w     |
| 12 |     |       |       | mno   | qrs   |       |
| 13 |     |       |       | (mno) |       | uvw   |
| 14 |     |       |       |       | (qrs) | (uvw) |

702

|    | 0   | 1     | 2     | 3     | 4     | 5     |
|----|-----|-------|-------|-------|-------|-------|
| 0  | e   | a     |       |       |       |       |
| 1  | i   |       | b     |       |       |       |
| 2  | m   |       |       | c     |       |       |
| 3  | q   |       |       |       | abc   |       |
| 4  | u   |       |       |       |       | (abc) |
| 5  |     | j     | f     |       |       |       |
| 6  |     | n     |       | g     |       |       |
| 7  |     | r     |       |       | efg   |       |
| 8  |     | v     |       |       |       | (efg) |
| 9  |     |       | o     | k     |       |       |
| 10 |     |       | s     |       | ijk   |       |
| 11 |     |       | w     |       |       | (ijk) |
| 12 |     |       |       | qrs   | mno   |       |
| 13 |     |       |       | uvw   |       | (mno) |
| 14 |     |       |       |       | (uvw) | (qrs) |

STORING DATA ACROSS GROUPS OF STORAGE NODES

BACKGROUND

This specification relates to digital data processing and, in particular, data storage, access, and maintenance.

Important data is conventionally stored on one or more storage devices that have the potential to fail. The data can be backed-up and stored redundantly so that the data can be recovered if a storage device fails. Conventional data centers can store large amounts of data. Some data is stored redundantly across multiple data centers so that even if an entire data center fails the data can be recovered.

Data can be stored using error-detecting codes. A conventional error-detecting code adds extra data to the data that enables detection of certain errors in the data. One example of an error-detecting code is a cyclic redundancy check (CRC). CRC codes are used to detect failures on storage devices (e.g., hard disk drives).

Data can also be stored using error-correcting codes. A conventional error-correcting code adds extra data to the data that enables correction of errors in the data. The number of errors that can be corrected is limited by the amount of extra data that is added. Examples of error-correcting codes include Reed-Solomon codes.

SUMMARY

An encoding system stores data chunks and error-correcting code chunks based on the data chunks. The data is stored so that data can be accessed from two data centers without having to perform reconstruction, the data is stored in at most n data centers, and the data can be accessed even when f data centers are not accessible. The resulting allocation of data chunks and code chunks can be viewed as a block design.

In general, one innovative aspect of the subject matter described in this specification can be embodied in methods that include the actions of receiving (n–f) data chunks for storage across n groups of storage nodes, wherein n and f are greater than or equal to two, and wherein (n–f) is greater than or equal to one; generating (f–1) error-correcting code chunks using an error-correcting code and the (n–f) data chunks; storing the (n–f) data chunks at a first group of storage nodes; and storing each data chunk of the (n–f) data chunks at a respective second group of storage nodes of a plurality of second groups of storage nodes and storing each code chunk of the (f–1) code chunks at a respective third group of storage nodes of a plurality of third groups of storage nodes, wherein each second group of storage nodes and each third group of storage nodes is distinct from each other and from the first group of storage nodes. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Storing the (n–f) data chunks at the first group of storage nodes includes determining that the data chunks are more likely to be accessed at the first group of storage nodes than any of the other groups of storage nodes. The error-correcting code is a systematic maximal-distance separable (MDS) code. The actions further include receiving a request for the (n–f) data chunks; determining that the first group of storage nodes is not accessible; and responding to the request using the group of storage nodes different from the first group of storage nodes. Responding to the request includes reading the data chunks stored at the different groups of storage nodes storing the data chunks. Responding to the request includes determining that at least one of the data chunks stored at the different groups of storage nodes is not accessible; and reconstructing the at least one data chunk using one or more of the code chunks. Each of the n groups of storage nodes corresponds to one of n vertices in a complete block design of size n, the complete block design including $$\binom{n}{2} = \frac{n \times (n-1)}{2}$$

blocks of vertices, the first group of storage nodes corresponding to a home vertex; each data chunk corresponds to a respective one of the blocks of vertices having the home vertex; each data chunk corresponds to a respective one of the blocks of vertices having a vertex corresponding to the respective second group of storage nodes; and storing the data chunks includes storing each data chunk at the group of storage nodes corresponding to the vertex in the block corresponding to the data chunk. Each data chunk corresponds to a respective one of the blocks of vertices having the home vertex in a first instance of the block design; and each data chunk corresponds to a respective one of the blocks of vertices having a vertex corresponding to the respective second group of storage nodes in a second instance of the block design, wherein each data chunk corresponds to a respective first vertex and a respective block in the first instance of the block design and a respective second vertex other than the first vertex in the respective block in the second instance of the block design.

Particular embodiments of the subject matter described in this specification can be implemented so as to realize one or more of the following advantages. Data can be stored, accessed, and maintained at one or more storage nodes. In comparison to conventional storage techniques, the amount of storage capacity required can be reduced, the amount of data that must be read to reconstruct a damaged chunk can be reduced, and the expected time to data loss can be increased for both random failures and for burst failures. Data can be made available at a home group of storage nodes and recovered efficiently even if the home group of storage nodes is completely inaccessible.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates the block design BD(6) as a table of rows and columns.

FIG. 6 illustrates an example allocation of data chunks and code chunks across six data centers.

FIG. 7 illustrates an example allocation of data chunks and code chunks across six data centers.

Like reference numbers and designations in the various drawings indicate like elements.

DETAILED DESCRIPTION

Figure 1:
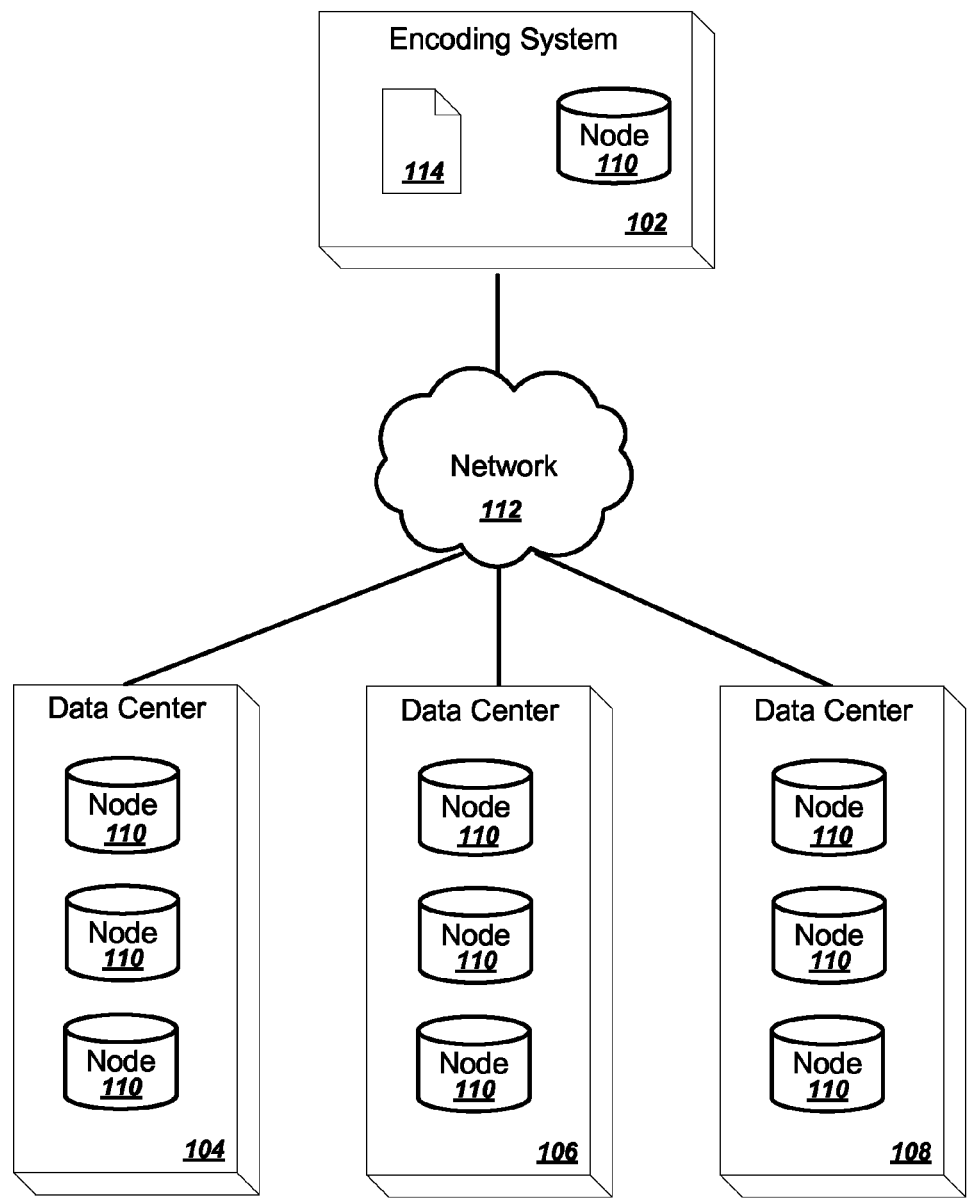
FIG. 1 is a schematic diagram of an example encoding system configured to store data having a specified home group of storage nodes.

FIG. 1 is a schematic diagram of an example encoding system 102 configured to store data having a specified home group of storage nodes.

The encoding system 102 comprises one or more computers. The encoding system 102 can store data chunks from a file 114 data at, for example, one or more local storage nodes 114, across storage nodes 110 at data centers 104, 106, and 108, or both. The encoding system 102 can also store redundant copies of data chunks and error-correcting code chunks. The encoding system communicates with the data centers 104, 106, and 108 using a network 112.

A storage node includes one or more computer storage mediums. In some implementations, a storage node is a data server, for example, a server including a data processing apparatus and multiple hard disk drives on which data can be stored. A group of storage nodes can include a rack, a sub-network, a data center, or various other collections of servers or storage nodes.

A data center is a group of storage nodes. Typically, a data center is a facility with physical space for computer systems. Data centers can include, for example, telecommunication systems, backup power supplies, climate controls, security. In FIG. 1, the data centers 104, 106, and 108 are shown with three storage nodes; however, each data center can have more or fewer storage nodes.

A data chunk is a specified amount of data. In some implementations, a data chunk is a contiguous portion of data from a file. In some other implementations, a data chunk is one or more non-continuous portions of data from a file. For example, a data chunk can be 256 bytes or other amount of data.

A damaged chunk is a chunk containing one or more errors. Typically, a damaged chunk is identified using an error detecting code. For example, a damaged chunk can be completely erased (e.g., if the chunk was stored in a hard drive destroyed in a hurricane), or a damaged chunk can have a single bit flipped. A healthy chunk is a chunk that is not damaged.

An error-correcting code chunk includes a chunk of data based on one or more data chunks. In some implementations, each code chunk is the same specified size (e.g., 256 bytes) as the data chunks. The code chunks are generated using an error-correcting code, e.g., a Maximal Distance Separable (MDS) code. Examples of MDS codes include Reed-Solomon codes. Various techniques can be used to generate the code chunks. In general, any error-correcting code can be used that can reconstruct d data chunks from any set of d unique, healthy chunks (either data chunks or code chunks).

In some implementations, metadata is used at the encoding system 102 or the data centers 104, 106, and 108 or both to keep track of stored data. For example, the metadata can specify which parts of a file are stored at which data centers, where redundant copies of data are stored, or which data chunks and code chunks form codewords.

Data chunks can be specified to be stored at certain data centers ("home" data centers). Data is homed if the data is specified to be available at its home data center without access to other data centers. Data that is determined to be more likely to be accessed at a certain data center can be specified to be available at that data center.

For example, data can be specified to be stored at a data center based on the data center's geographic location. Suppose the encoding system 102 receives a file over the internet. The encoding system 102 can determine a geographic location for the file, e.g., using an internet protocol (IP) address for a sender of the file and an IP address to geographic location mapping, and then specify that the file is homed to a data center that is closer than other data centers to the determined geographic location for the file.

In some implementations, data chunks are stored at a home data center and other data centers, along with error-correcting code chunks. In particular, in some systems, data is stored such that the following requirements are satisfied:

1. The data can be accessed from at least two data centers without performing any reconstruction. This is useful, for example, so that data can be accessed quickly even where the home data center is not accessible.
2. The data is stored in at most n data centers, where n is greater than or equal to two.
3. The data can be accessed, possibly requiring reconstruction, even when f data centers are not accessible, where f is greater than or equal to two.

These requirements can be met by strategically storing data chunks and code chunks across data centers, e.g., as described below in reference to FIGS. 2 and 4. The system can also store additional error-correcting code chunks within each data center so that each data center can reconstruct failed chunks without performing cross-data center communication. For example, the error-correcting code chunks stored within each data center can be generated with a Reed-Solomon, orthogonal, nested code, or the like.

Figure 2:
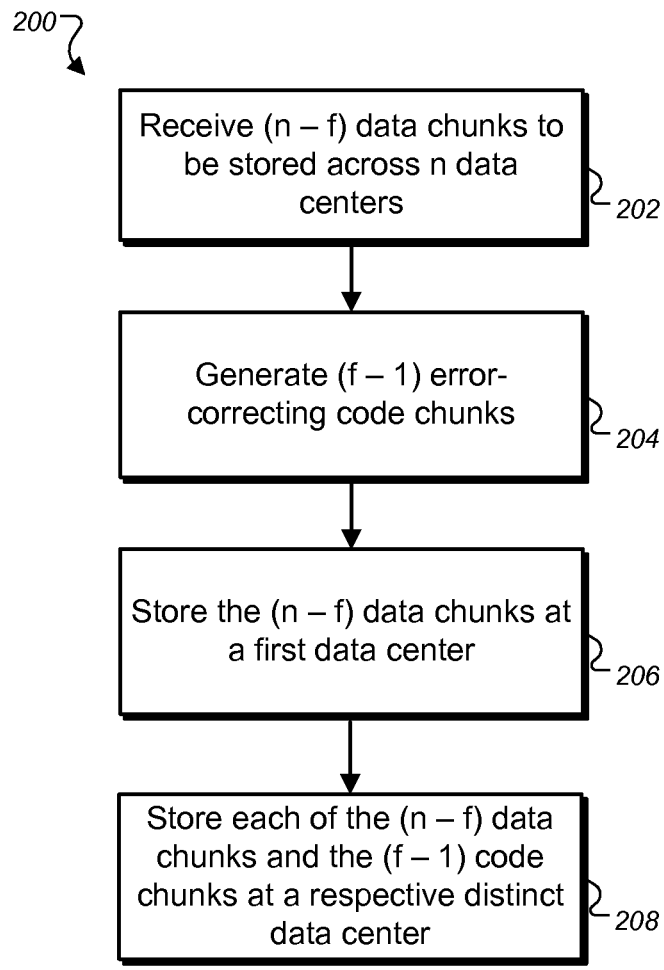
FIG. 2 is a flow diagram of an example process for storing data chunks across data centers.

FIG. 2 is a flow diagram of an example process 200 for storing data chunks across data centers. Although the process 200 is described for storing data chunks across data centers, the process 200 can be performed for storing data chunks across groups of storage nodes. For purposes of illustration, the process 200 will be described with respect to a system that performs the process 200. The process 200 can be performed by a system of one or more computers (e.g., the encoding system 102 of FIG. 1).

The system receives (n−f) data chunks to be stored across n data centers (202). The data chunks can be, for example, contiguous or non-contiguous blocks of data from a file (e.g., an email message, a web page, an image file.)

The system generates (f−1) error-correcting code chunks (204). The system uses an error-correcting code and the data chunks to generate the error-correcting code chunks. The error-correcting code can be, for example, a systematic MDS code.

The system stores the data chunks in a first data center (206). The first data center can be a home data center for the data chunks. For example, the system can determine that the data chunks are more likely to be accessed at the first data center than any of the other data centers.

The system also stores each of the data chunks and each of the code chunks at a respective distinct data center (208). The system stores each data chunk of the (n−f) data chunks at a respective second data center of a plurality of second data centers. The system stores each code chunk of the (f−1) code chunks at a respective third data center of a plurality of third data centers. Each second data center and each third data center is distinct from each other and from the first data center. Including both the data chunks and the code chunks, there are a total of (n−f)+(f−1)=(n−1) chunks. So each of the (n−1) data centers different from the first data center stores one chunk, either a data chunk or a code chunk.

When a data center fails, so that no data stored there is accessible, the data can be recovered from the other data centers, perhaps requiring reconstruction using the code chunks. For example, the system can receive a request for one or more data chunks homed to a first data center, determine that the first data center is inaccessible (or some of the data at the first group of storage nodes is inaccessible), and respond to the request using the data centers different from the first data center. Responding to the request can include reconstructing one or more of the data chunks using one or more of the code chunks.

In general, when a particular data chunk Di is requested and some set of f groups of storage nodes is inaccessible, there are three possible cases for determining Di:
1. The home group of storage nodes for Di is accessible. In this case, Di can be determined by accessing Di at the home group of storage nodes.
2. A group of storage nodes different from the home group but storing Di is accessible. In this case, Di can be determined by accessing Di at the different group of storage nodes.
3. Both the home group of storage nodes and any other group of storage nodes storing Di are inaccessible. In this case, Di can be determined by reading the data chunks and code chunks that are stored in the (n−f) accessible groups of storage nodes, yielding a total of (n−f) chunks. Because the code chunks were generated using an error-correcting code, Di can be reconstructed from the (n−f) chunks out the total of (n−1) data chunks and code chunks that formed a code word.

Figure 3:
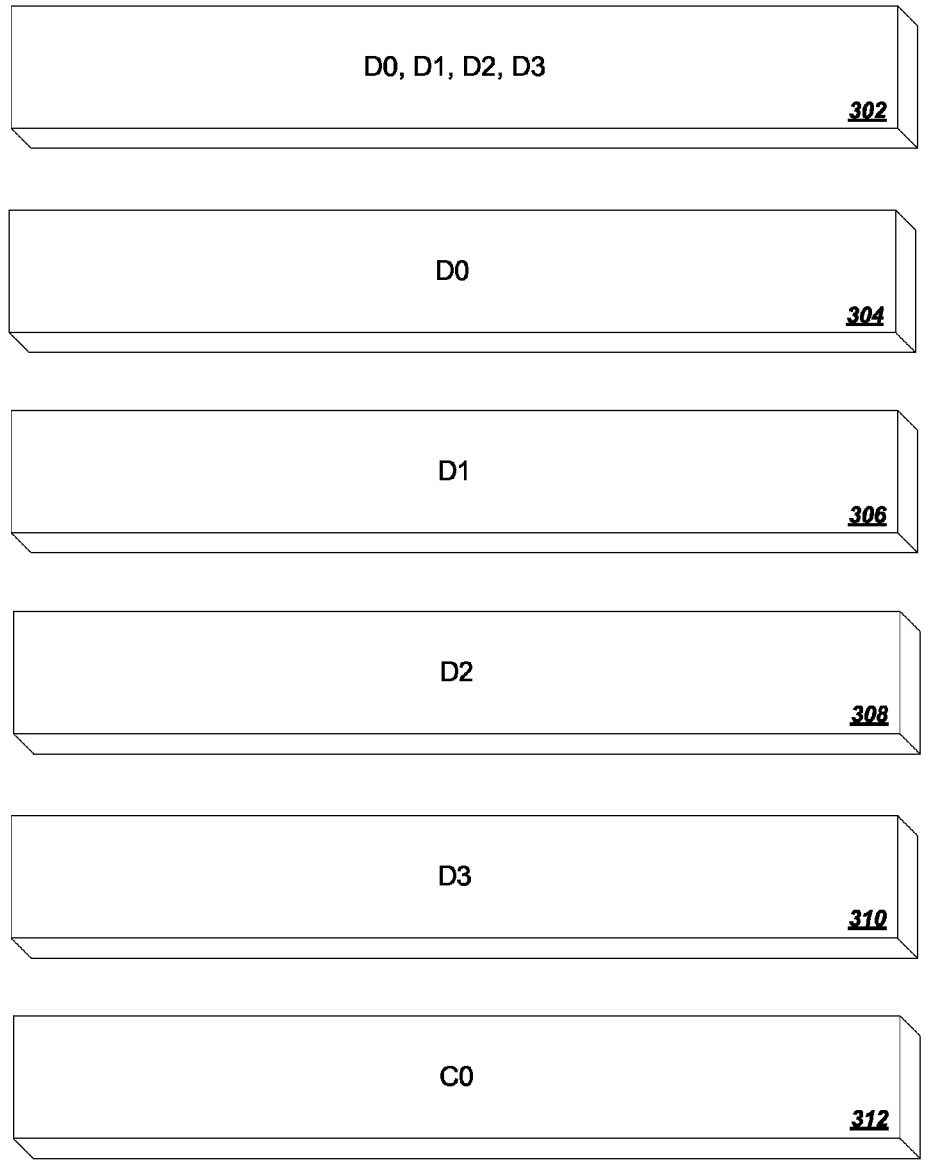
FIG. 3 is a schematic diagram illustrating an example of data chunks stored using the process illustrated in FIG. 2.

FIG. 3 is a schematic diagram illustrating an example of data chunks stored using the process 200 illustrated in FIG. 2. In this example, there are six data centers 302-312, and four data chunks D0-D3. Referencing the requirements discussed above with respect to FIG. 1, n=6 and f=2, so that (n−f)=4 and (f−1)=1. For the four data chunks D0-D3, an error-correcting code is used to create one error-correcting code chunk, C0.

The first data center 302 is the home data center for the data chunks D0-D3. Thus, the data chunks D0-D3 are all stored at the first data center 302. Each of the data chunks D0-D3 and the code chunk C0 are all also stored at distinct data centers 304-312 different from the first data center 302.

This results in the first data center 302 storing more data (four chunks) than the other data centers 304-312 (one chunk each). However, if data chunks having various home data centers among all the data centers 302-312 are stored across multiple data centers, the data storage can be distributed among all the data centers e.g., evenly.

Referring back to the process 200 of FIG. 2, if each group of storage nodes is a home group of storage nodes for at least some data, then the overall storage can be viewed as forming the Block Design BD(n). In particular, the overall storage can viewed as a complete block design with blocks of size 2 (denoted k=2).

A block design is a mathematical construction that meets conditions given by a set of parameters. Let BD(n) denote vertices Vn={0, 1, ..., n−1} and a collection Bn including all subsets of Vn of size 2 (because the block design has blocks of size 2, denoted k=2). Each subset within Bn is called a block. BD(n) is called the block design of size n.

For example, BD(6) includes V6={0, 1, 2, 3, 4, 5} and Bn including the 15 pairs of vertices {0, 1}, {0, 2}, {0, 3}, {0, 4}, {0, 5}, {1, 2}, {1, 3}, {1, 4}, {1, 5}, {2, 3}, {2, 4}, {2, 5}, {3, 4}, {3, 5}, and {4, 5}. In general, Bn includes $$\binom{n}{2} = \frac{n \times (n-1)}{2}$$

blocks, each vertex in Vn is contained in n−1 blocks, and each pair of vertices (a, b), where a and b are in Vn, is contained in one block.

FIG. 4 illustrates the block design BD(6) as a table of rows and columns. The rows are labeled 0-14 and the columns are labeled 0-5. Each column corresponds to one of the six vertices from V6. Each row corresponds to one of the 15 pairs of vertices from Bn. For example, row 0 corresponds to the pair {0, 1} because there are 'X' marks in columns 0 and 1, row 1 corresponds to the pair {0, 2} because there are 'X' marks in columns 0 and 2, and so on. Referring back to FIG. 3, each column can be viewed as corresponding to one of the data centers. The 'X' marks correspond to chunks (data or code) that are allocated to the data centers.

Figure 5:
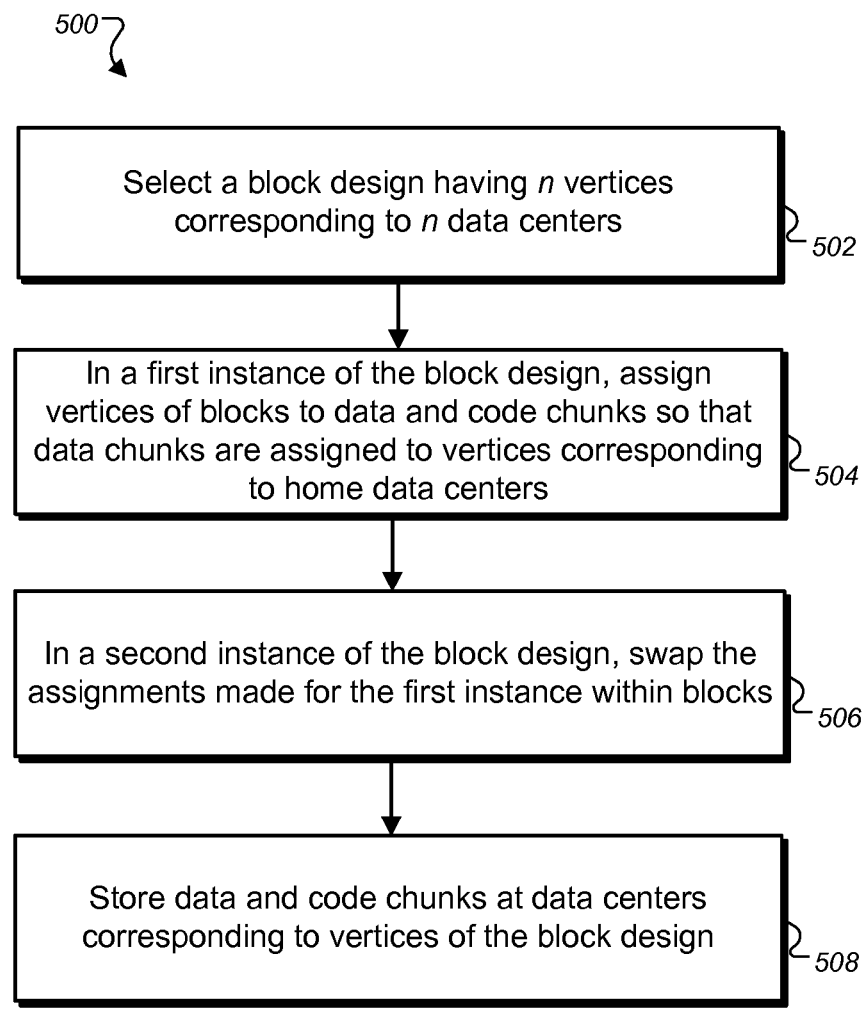
FIG. 5 is a flow diagram of an example process for storing data chunks across data centers.

FIG. 5 is a flow diagram of an example process 500 for storing data chunks across data centers (or other groups of storage nodes). In some implementations, stages 502, 504, and 506 are performed by a person designing an encoding system, and stage 508 is performed by the encoding system that operates in accordance with the design.

A block design including all blocks of size 2 is selected (502). The block design is of size n where n is the number of data centers. Each vertex of the block corresponds to a data center. The block design includes $$\binom{n}{2} = \frac{n \times (n-1)}{2}$$

blocks, and each block corresponds to 2 chunks, where each chunk can be a data chunk or a code chunk. The chunks of a block are stored in data centers that correspond to the vertices of the block. For example, for every group of (n−f) data chunks that are stored, (f−1) code chunks can be generated and stored. Two instances of the block design can be used to assign data and code chunks to data centers.

In a first instance of the block design, vertices of blocks are assigned to data and code chunks so that data chunks are assigned to vertices corresponding to home data centers (504). For example, (n−f) data chunks can be assigned to a vertex corresponding to the home data center of those (n−f) data chunks. Different groups of (n−f) data chunks can then be assigned to each data center so that each data center is assigned (n−f) data chunks that are homed to that data center. Code chunks for the data chunks are also assigned to the data centers. The code chunks are generated from the data chunks using an error-correcting code. In some implementations, the code chunks assigned according to the first instance of the block design are not stored. Instead, those code chunks are assigned for conceptual purposes, and are actually stored according to a second instance of the block design.

In the second instance of the block design, the assignments made for the first instance are swapped within blocks (506). For example, if first and second data chunks were assigned to first and second data centers, respectively, in the first instance of the block design, then the first data chunk is assigned to the second center and the second data chunk is assigned to the first data center in the second instance of the block design. Similarly, code chunks assigned in the first instance of the block design are swapped with the other chunk within blocks, and the other chunk can be a data chunk or a code chunk.

Data chunks are stored across the data centers according to the assignments in the first and second instances of the block design (508). Because data chunks are assigned in the first and second instances of the block design, each data chunk is stored twice—once at its home data center and once at another data center. Code chunks are generated and stored across the data centers according to the assignments in the first and second block designs. As mentioned above, code chunks assigned to the first instance of the block design are not actually stored in some implementations.

FIG. 6 illustrates an example allocation of data chunks and code chunks across six data centers (or other groups of storage nodes.) In this example, n=6 and f=2. The allocation is illustrated as a table of rows and columns, where the columns correspond to data centers and the rows correspond to blocks in the block design illustrated in FIG. 4. The lower case letters in the rows represent data or code chunks. A single letter indicates a data chunk, and multiple letters indicates a code chunk based on the data chunks corresponding to those letters. For example, row 4 column 0 contains "abcd", which is a code chunk based on the individual data chunks a, b, c, and d.

The columns are labeled 0-5. The rows are labeled 0-14, twice. The first set of rows 602 is a first instance of the block design, and the second set of rows 604 is a second instance of the block design. In the second set of rows 604, the letters are italicized to illustrate that the assignments have been swapped, within blocks, from the assignments made in the first set of rows 602.

For example, consider chunk a, which is at row 0 column 0 in the first set of rows 602. Chunk a is in a block with chunk e in the first set of rows 602, so chunk e and chunk a are swapped in the second set of rows 604. Chunk e is shown in the second set of rows 604 at the same position as chunk a in the first set of rows 602, that is, at row 0 column 0.

In this example, the chunks a, b, c, and d are homed to the data center of column 0; the chunks e, f, g, and h are homed to the data center of column 1; the chunks i, j, k, and l are homed to the data center of column 2; the chunks m, n, o, and p are homed to the data center of column 3; the chunks q, r, s, and t are homed to the data center of column 4; and the chunks u, v, w, and x are homed to the data center of column 5.

Letters shown in bold are not actually stored, but are shown for conceptual purposes. Consider the code chunk based on "abcd" shown at row 4 column 0 in the first set of rows 602. Because it is shown in bold, it is not actually stored. However, in the second set of rows 604, abcd is at row 4 column 5, and it is not shown in bold. In the second set of rows 604, it has been swapped with the chunk u, which was in the same block in the first set of rows 602. So the code chunk abcd is actually stored at the data center corresponding to column 5.

Empty positions in the table do not indicate storage space that needs to be reserved or that will store other data. Instead, all of the letters in a column indicate what data or code chunks are stored in the data center corresponding to the column, but do not indicate that the chunks are stored contiguously or in any spatial relationship illustrated by the table. So, for example, the data center corresponding to column 0 stores a, b, c, d, e, i, m q, and u. The code chunk "abcd" is not stored. The data chunks a, b, c, and d are homed to that data center.

For another example, the data center corresponding to column 4 stores q, r, s, t, d, h, l, p and a code chunk based on u, v, w, and x. The data chunks q, r, s, and t are homed to that data center.

FIG. 7 illustrates an example allocation of data chunks and code chunks across six data centers (or other groups of storage nodes.) In this example, n=6 and f=3. So compared to the allocation of FIG. 6, two code chunks are generated from each set of three data chunks, rather than one code chunk being generated from each set of four data chunks. The additional code chunks are shown in parenthesis.

For example, consider the data chunks a, b, and c, which are homed to the data center corresponding to column 0. Two code chunks are generated from a, b, and c, abc and (abc). Although code chunks abc and (abc) appear in column 0, they are in bold and therefore not stored at that data center. Instead, abc is stored in the data center corresponding to column 4, and (abc) is stored in the data center corresponding to column 5.

Figure 8:
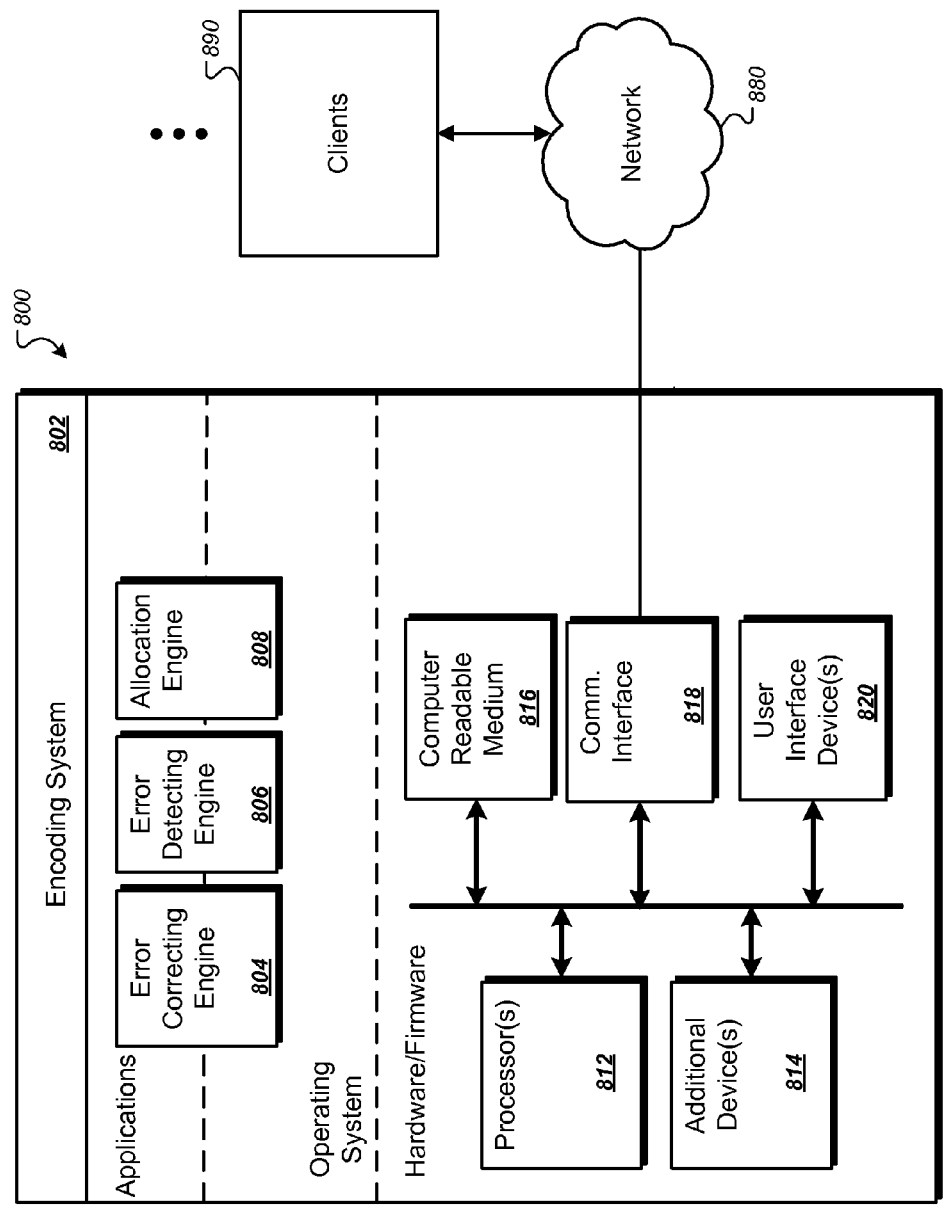
FIG. 8 is a schematic diagram of an example system configured for data storage, access, and maintenance.

FIG. 8 is a schematic diagram of an example system configured for data storage, access, and maintenance. The system generally consists of an encoding system 602 of one or more computers. The system 802 is optionally connected to one or more user or client computers 890 through a network 880. The system 802 includes various modules, e.g. executable software programs, including an error correcting engine 804 for generating code chunks and reconstructing damaged chunks. An error detecting code engine 806 is configured to identify damaged chunks of data. An allocation engine 808 allocates code chunks and data chunks between one or more groups of storage nodes.

Each module runs as part of the operating system on the system 802, runs as an application on the system 802, or runs as part of the operating system and part of an application on the system 802, for instance. Although several software modules are illustrated, there may be fewer or more software modules. Moreover, the software modules can be distributed on one or more data processing apparatus connected by one or more networks or other suitable communication mediums.

The system 802 also includes hardware or firmware devices including one or more processors 812, one or more additional devices 814, a computer readable medium 816, a communication interface 818, and optionally one or more user interface devices 820. Each processor 812 is capable of processing instructions for execution within the system 802. In some implementations, the processor 812 is a single or multi-threaded processor. Each processor 812 is capable of processing instructions stored on the computer readable medium 816 or on a storage device such as one of the additional devices 814. The system 802 uses its communication interface 818 to communicate with one or more computers 890, for example, over a network 880.

In some implementations, the system 802 does not have any user interface devices. In other implementations, the system 802 includes one or more user interface devices. Examples of user interface devices 820 include a display, a camera, a speaker, a microphone, a tactile feedback device, a keyboard, and a mouse. The system 802 can store instructions that implement operations associated with the modules described above, for example, on the computer readable medium 816 or one or more additional devices 814, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
receiving (n−f) data chunks for storage across n groups of storage nodes, wherein n and f are greater than or equal to two, and wherein (n−f) is greater than or equal to one;
generating (f−1) error-correcting code chunks using an error-correcting code and the (n−f) data chunks;
storing the (n−f) data chunks at a first group of storage nodes; and
storing each data chunk of the (n−f) data chunks at a respective second group of storage nodes of a plurality of second groups of storage nodes and storing each code chunk of the (f−1) code chunks at a respective third group of storage nodes of a plurality of third groups of storage nodes, wherein each second group of storage nodes and each third group of storage nodes is distinct from each other and from the first group of storage nodes; wherein:
each of the n groups of storage nodes corresponds to one of n vertices in a complete block design of size n, the complete block design including $$\binom{n}{2} = \frac{n \times (n-1)}{2}$$

blocks of vertices, the first group of storage nodes corresponding to a home vertex;
each data chunk corresponds to a respective one of the blocks of vertices having the home vertex;
each data chunk corresponds to a respective one of the blocks of vertices having a vertex corresponding to the respective second group of storage nodes; and
storing the data chunks includes storing each data chunk at the group of storage nodes corresponding to the vertex in the block corresponding to the data chunk.

2. The method of claim 1, wherein storing the (n−f) data chunks at the first group of storage nodes includes determining that the data chunks are more likely to be accessed at the first group of storage nodes than any of the other groups of storage nodes.

3. The method of claim 1, wherein the error-correcting code is a systematic maximal-distance separable (MDS) code.

4. The method of claim 1, further comprising:
receiving a request for the (n−f) data chunks;
determining that the first group of storage nodes is not accessible; and
responding to the request using the group of storage nodes different from the first group of storage nodes.

5. The method of claim 4, wherein responding to the request includes reading the data chunks stored at the different groups of storage nodes storing the data chunks.

6. The method of claim 4, wherein responding to the request includes:
determining that at least one of the data chunks stored at the different groups of storage nodes is not accessible; and
reconstructing the at least one data chunk using one or more of the code chunks.

7. The method of claim 1, wherein:
each data chunk corresponds to a respective one of the blocks of vertices having the home vertex in a first instance of the block design; and
each data chunk corresponds to a respective one of the blocks of vertices having a vertex corresponding to the respective second group of storage nodes in a second instance of the block design, wherein each data chunk corresponds to a respective first vertex and a respective block in the first instance of the block design and a respective second vertex other than the first vertex in the respective block in the second instance of the block design.

8. A system of one or more computers configured to perform operations comprising:
receiving (n−f) data chunks for storage across n groups of storage nodes, wherein n and f are greater than or equal to two, and wherein (n−f) is greater than or equal to one;
generating (f−1) error-correcting code chunks using an error-correcting code and the (n−f) data chunks;
storing the (n−f) data chunks at a first group of storage nodes; and
storing each data chunk of the (n−f) data chunks at a respective second group of storage nodes of a plurality of second groups of storage nodes and storing each code chunk of the (f−1) code chunks at a respective third group of storage nodes of a plurality of third groups of storage nodes, wherein each second group of storage nodes and each third group of storage nodes is distinct from each other and from the first group of storage nodes; wherein:

each of the n groups of storage nodes corresponds to one of n vertices in a complete block design of size n, the complete block design including $$\binom{n}{2} = \frac{n \times (n-1)}{2}$$

blocks of vertices, the first group of storage nodes corresponding to a home vertex;

each data chunk corresponds to a respective one of the blocks of vertices having the home vertex;

each data chunk corresponds to a respective one of the blocks of vertices having a vertex corresponding to the respective second group of storage nodes; and storing the data chunks includes storing each data chunk at the group of storage nodes corresponding to the vertex in the block corresponding to the data chunk.

9. The system of claim 8, wherein storing the (n–f) data chunks at the first group of storage nodes includes determining that the data chunks are more likely to be accessed at the first group of storage nodes than any of the other groups of storage nodes.

10. The system of claim 8, wherein the error-correcting code is a systematic maximal-distance separable (MDS) code.

11. The system of claim 8, the operations further comprising:

receiving a request for the (n–f) data chunks;

determining that the first group of storage nodes is not accessible; and responding to the request using the group of storage nodes different from the first group of storage nodes.

12. The system of claim 11, wherein responding to the request includes reading the data chunks stored at the different groups of storage nodes storing the data chunks.

13. The system of claim 11, wherein responding to the request includes:

determining that at least one of the data chunks stored at the different groups of storage nodes is not accessible; and reconstructing the at least one data chunk using one or more of the code chunks.

14. The system of claim 8, wherein:

each data chunk corresponds to a respective one of the blocks of vertices having the home vertex in a first instance of the block design; and each data chunk corresponds to a respective one of the blocks of vertices having a vertex corresponding to the respective second group of storage nodes in a second instance of the block design, wherein each data chunk corresponds to a respective first vertex and a respective block in the first instance of the block design and a respective second vertex other than the first vertex in the respective block in the second instance of the block design.

15. A non-transitory computer storage medium encoded with a computer program, the program comprising instructions that when executed by one or more computers cause the one or more computers to perform operations comprising:

receiving (n–f) data chunks for storage across n groups of storage nodes, wherein n and f are greater than or equal to two, and wherein (n–f) is greater than or equal to one;

generating (f–1) error-correcting code chunks using an error-correcting code and the (n–f) data chunks;

storing the (n–f) data chunks at a first group of storage nodes; and storing each data chunk of the (n–f) data chunks at a respective second group of storage nodes of a plurality of second groups of storage nodes and storing each code chunk of the (f–1) code chunks at a respective third group of storage nodes of a plurality of third groups of storage nodes, wherein each second group of storage nodes and each third group of storage nodes is distinct from each other and from the first group of storage nodes; wherein:

each of the n groups of storage nodes corresponds to one of n vertices in a complete block design of size n, the complete block design including $$\binom{n}{2} = \frac{n \times (n-1)}{2}$$

blocks of vertices, the first group of storage nodes corresponding to a home vertex;

each data chunk corresponds to a respective one of the blocks of vertices having the home vertex;

each data chunk corresponds to a respective one of the blocks of vertices having a vertex corresponding to the respective second group of storage nodes; and storing the data chunks includes storing each data chunk at the group of storage nodes corresponding to the vertex in the block corresponding to the data chunk.

16. The computer storage medium of claim 15, wherein storing the (n–f) data chunks at the first group of storage nodes includes determining that the data chunks are more likely to be accessed at the first group of storage nodes than any of the other groups of storage nodes.

17. The computer storage medium of claim 15, wherein the error-correcting code is a systematic maximal-distance separable (MDS) code.

18. The computer storage medium of claim 15, the operations further comprising:

receiving a request for the (n–f) data chunks;

determining that the first group of storage nodes is not accessible; and responding to the request using the group of storage nodes different from the first group of storage nodes.

19. The computer storage medium of claim 18, wherein responding to the request includes reading the data chunks stored at the different groups of storage nodes storing the data chunks.

20. The computer storage medium of claim 18, wherein responding to the request includes:

determining that at least one of the data chunks stored at the different groups of storage nodes is not accessible; and reconstructing the at least one data chunk using one or more of the code chunks.

21. The computer storage medium of claim 15, wherein:

each data chunk corresponds to a respective one of the blocks of vertices having the home vertex in a first instance of the block design; and each data chunk corresponds to a respective one of the blocks of vertices having a vertex corresponding to the respective second group of storage nodes in a second instance of the block design, wherein each data chunk corresponds to a respective first vertex and a respective block in the first instance of the block design and a respective second vertex other than the first vertex in the respective block in the second instance of the block design.

* * * * *